(12) United States Patent
Kawano et al.

(10) Patent No.: US 8,054,436 B2
(45) Date of Patent: Nov. 8, 2011

(54) SUBSTRATE FOR DISPLAY DEVICE AND DISPLAY DEVICE

(75) Inventors: Hideo Kawano, Kanagawa-Ken (JP); Hideki Sunayama, Tokyo-To (JP)

(73) Assignee: InfoVision Optoelectronics Holdings Limited, Tortola (VG)

( * ) Notice: Subject to any disclaimer, the term of this patent is extended or adjusted under 35 U.S.C. 154(b) by 1016 days.

(21) Appl. No.: 11/904,232

(22) Filed: Sep. 26, 2007

(65) Prior Publication Data

US 2008/0074351 A1  Mar. 27, 2008

(30) Foreign Application Priority Data

Sep. 26, 2006  (JP) .................. 2006-260062

(51) Int. Cl.
*G02F 1/1345* (2006.01)

(52) U.S. Cl. ........................ 349/152; 349/149
(58) Field of Classification Search ........... 349/149–152
See application file for complete search history.

(56) References Cited

U.S. PATENT DOCUMENTS 6,078,366 A * 6/2000 Dohjo et al. .................. 349/43
2008/0198108 A1* 8/2008 Aoki .............................. 345/87

FOREIGN PATENT DOCUMENTS

JP  08-122819 A  5/1996

* cited by examiner

*Primary Examiner* — Dung T. Nguyen
(74) *Attorney, Agent, or Firm* — Connolly Bove Lodge & Hutz LLP

(57) ABSTRACT

A substrate for display device is provided. As a wiring structure of the substrate, the scan line layer and the signal line layer are not connected directly by arranging through-holes between the scan line layer and the signal line layer, but are connected through an ITO layer by arranging through-holes between the scan line layer and the ITO layer and arranging through-holes between the signal line layer and the ITO layer, with an object to reduce the value of the connection resistance between the scan line layer and the signal line layer. Through-holes connecting the scan line layer and the ITO layer and through-holes connecting the signal line layer and the ITO layer are configured in a comb shape respectively and engaged with each other. Thus the length of the ITO connecting the scan line layer and the signal line layer becomes shorter and the value of the connection resistance is reduced.

9 Claims, 3 Drawing Sheets

SUBSTRATE FOR DISPLAY DEVICE AND DISPLAY DEVICE

FIELD OF THE INVENTION

The present invention relates to a wiring structure and a wiring method in an array substrate for a display device of a liquid crystal display device.

BACKGROUND OF THE INVENTION

Wirings for checking, pads and wirings called as short rings, which are necessary in the manufacture process of an array substrate for a display device of a liquid crystal display device, are arranged on periphery regions of the array substrate of a display device. The wirings called as short rings refer to wirings that make scan lines and signal lines short-circuited, allowing for destroys caused by static electricity occurred in the manufacture process.

In the periphery regions, in order to short-circuit scan lines and signal lines, through-holes are needed since the scan lines and the signal lines exist in different layers with an insulation layer sandwiched therebetween. Conventionally, through-holes are provided to directly connect the scan lines and the signal lines. FIG. 5 is a schematic cross sectional view for illustrating a through-hole directly connecting a scan line and a signal line. In FIG. 5, 303 denotes an ITO (Indium Tin Oxide) layer serving as a transparent electrode layer, 105 denotes a signal line layer, 101 denotes a scan line layer, and 701 denotes a through-hole arranged between the scan line layer and the signal line layer.

But in recent years, in order to reduce photolithography processes, through-holes are not used to directly connect scan lines and signal lines, but are formed on scan lines and signal lines at first, then an ITO layer is filled in the through-holes, thereby the scan lines and the signal lines are connected through the ITO layer. The manufacture process mentioned above is gradually popularized. The description is made herebelow in conjunction with the drawings.

FIG. 3 is a schematic cross sectional view of an array substrate, which is made by the above mentioned manufacture process and in which scan lines and signal lines are connected through an ITO layer. In FIG. 3, 303 denotes an ITO layer, 101 denotes a scan line, 105 denotes a signal line, 102 denotes a through-hole arranged on the scan line 101, into which the ITO layer is filled, 104 denotes a through-hole arranged on the signal line 105, into which the ITO layer is filled similarly. P1 is a point in the part of the scan line layer 101 abutting the scan line layer through-hole 102, which is the nearest point to the signal line layer through-hole 104. P2 is a point in the part of the signal line layer 105 abutting the signal line layer through-hole 104, which is the nearest point to the through-hole 102 on the scan line layer.

In FIG. 3, instead of directly connecting with each other, the scan line 101 and the signal line 105 are connected through the ITO layer 303. This type of connection can reduce photolithography processes and manufacture cost.

However, since the resistance rate of the ITO layer is not low enough, the resistance of the ITO layer between the point P1 and the point P2 may not be neglectable when the resistance between the through-hole 102 and the through-hole 104 is taken in account. The value of connection resistance between the scan line 101 and the signal line 105, when the scan line 101 and the signal line 105 are connected via the through-holes 102 and 104, mainly depends on the resistance value of the ITO layer between the point P1 and the point P2. In addition, the resistance value of the ITO layer between the point P1 and the point P2 is directly proportional to the length of the ITO between the point P1 and the point P2.

Related information has also been specifically disclosed in Patent Document 1: Japanese Patent Laid-Open Publication No. 8-122819.

Hence, in order to reduce the resistance value between the through-hole 102 and the through-hole 104, it is required to reduce the length between the point P1 and the point P2 as short as possible.

SUMMARY OF THE INVENTION

An object of the present invention is therefore to provide a wiring structure and a wiring method. According to an embodiment of the present invention, when an array substrate is so structured that a through-hole is needed in the periphery area of the substrate and a scan line and a signal line are short-circuited by an ITO, the length of the ITO between the scan line and the signal line becomes short, and thereby the resistance of the part which connects the scan line and the signal line can be reduced.

For the purpose of solving the problems mentioned above, according to the first aspect of the present invention, a substrate for a display device is provided, which includes: a signal line layer having a plurality of signal lines thereon, a plurality of signal line layer through-holes being arranged on the signal line layer, a scan line layer having a plurality of scan lines thereon, a plurality of scan line layer through-holes being arranged on the scan line layer, and a transparent electrode layer electrically connecting the scan lines and the signal lines via the signal line layer through-holes and the scan line layer through-holes; wherein the scan line layer through-holes and the signal line layer through-holes are arranged intercrossedly in a matrix form.

In addition, according to the second aspect of the present invention, a substrate for a display device is provided, wherein, the scan line layer through-holes and the signal line layer through-holes being arranged intercrossedly includes the scan line layer through-holes and the signal line layer through-holes being staggered in rows.

In addition, according to the third aspect of the present invention, a substrate for a display device is provided, wherein, the scan line layer through-holes and the signal line layer through-holes arranged being staggered in rows includes the scan line layer through-holes and the signal line layer through-holes being arranged in a shape of mutually engaged combs.

In addition, according to the fourth aspect of the present invention, a substrate for a display device is provided, wherein, the comb back of the signal line comb shape of the signal line layer through-holes, which consists of the tooth roots of the comb shape of the signal line layer through-holes, is formed by two or more columns of the signal line layer through-holes.

In addition, according to the fifth aspect of the present invention, the substrate for a display device according to any one of the first to fourth aspects of the present invention is provided, wherein, the substrate for a display device is a substrate for an active matrix liquid crystal display device.

In addition, according to the sixth aspect of the present invention, the substrate for a display device according to any one of the first to fifth aspects of the present invention is provided, wherein, the transparent electrode is made of ITO.

In addition, according to the seventh aspect of the present invention, the substrate for a display device according to the first aspect of the present invention is provided, wherein, the substrate for the display device further includes: a display unit, formed adjacent to each intersection points of the signal lines and the scan lines.

In addition, according to the eighth aspect of the present invention, the substrate for a display device according to any one of the first to seventh aspects of the present invention is provided, wherein, the signal lines and the scan lines sandwiching an insulation layer therebetween are arranged in length and breadth on an insulated substrate; the transparent electrode layer is set over the signal lines and the scan lines; the substrate for a display device is so structured that the signal line layer is formed after the scan line layer is formed, and then the transparent electrode layer is formed in a subsequent process.

In addition, according to the ninth aspect of the present invention, the substrate for a display device according to the eighth aspect of the present invention is provided, wherein, the scan line layer and the signal line layer being electrically connected through the transparent electrode layer includes: the scan line layer and the signal line layer are electrically connected through the transparent electrode layer that is filled in the scan line layer through-holes and filled in the signal line layer through-holes.

In addition, according to the tenth aspect of the present invention, a display device is provided, which includes the substrate for a display device according to any one of the first to the ninth aspects of the present invention.

According to the present invention, in the wiring structure of the substrate for the display device, the scan line layer and the signal line layer are connected through an ITO layer by arranging through-holes between the scan line layer and the ITO layer and arranging through-holes between the signal line layer and the ITO layer, instead of directly connected by arranging through-holes between the scan line layer and the signal line layer. Thus the value of the connection resistance between the scan line layer and the signal line layer can be reduced.

In Figures, 101 denotes scan lines, 102 denotes scan line layer through-holes which are used to connect the scan lines 101 and the ITO layer; 103 denotes the comb tooth part of comb shape formed by the signal line layer through-holes; 104 denotes the signal line layer through-holes which are used to connect signal lines and the ITO layer; 105 denotes signal lines; 106 denotes an area configured with the scan line layer through-holes and the signal line layer through-holes; 107 denotes comb tooth part of comb shape formed by the scan line layer through-holes.

DETAILED DESCRIPTION OF THE INVENTION

Embodiments of the present invention will be described in detail below with reference to the drawings.

Figure 1:
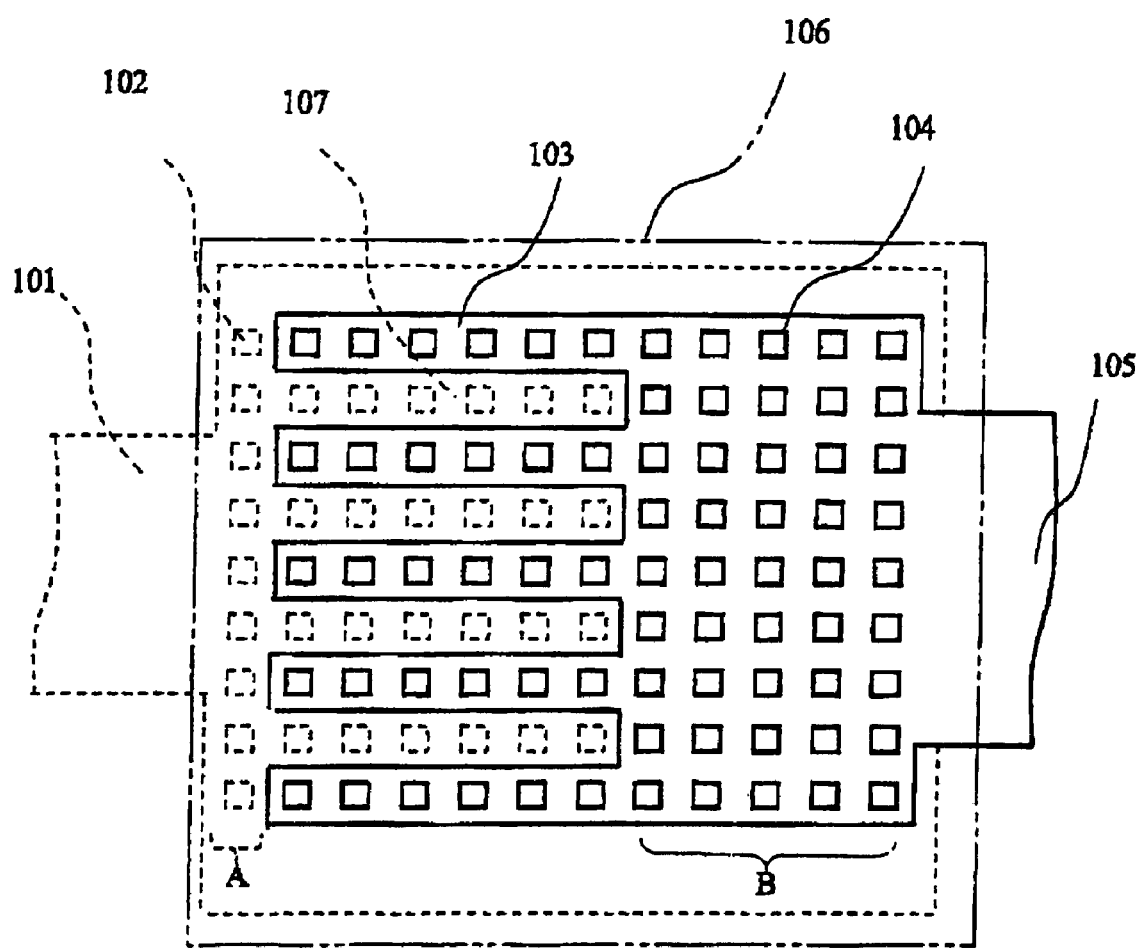
FIG. 1 is a partial plan view of configuration of through-holes which connect a scan line layer and a signal line layer, embodying a feature of the substrate for the display device according to one embodiment of the present invention.

FIG. 1 is a partial plan view of configuration of through-holes which connect a scan line layer and a signal line layer, embodying a feature of the substrate for the display device according to an embodiment of the present invention. In FIG. 1, 101 denotes scan lines, 102 denotes the scan line layer through-holes used to connect the scan lines 101 and the ITO layer, 105 denotes signal lines, 104 denotes signal line layer through-holes used to connect the signal lines and the ITO layer, 103 denotes comb tooth of comb shape formed by the signal line layer through-holes, 107 denotes comb tooth of comb shape formed by the scan line layer through-holes, 106 denotes an area configured with the scan line layer through-holes and the signal line layer through-holes. A denotes the width of the comb back of the comb shape formed by the scan line layer through-holes, B denotes the width of the comb back of the comb shape formed by the signal line layer through-holes.

Considering that the scan line layer is formed first and then an insulation layer as well as a signal line layer is formed thereon, the scan lines 101 and the scan line layer through-holes are drawn in dashed line. In addition, considering that the signal line layer is formed in a subsequent process after the scan line layer is formed, and is formed on the scan line layer, the signal lines 105 and the signal line layer through-holes are drawn in solid line.

As shown in FIG. 1, the scan line layer through-holes are arranged in a comb shape on the left of the area 106, and the signal line layer through-holes are arranged in a comb shape on the right of the area 106, the comb teeth of which are engaged with the comb teeth of the comb shape on the left of the area 106. With such a configuration, the value of the connection resistance between the scan line layer and the signal line layer, which are connected using adjacent scan line layer through-holes and signal line layer through-holes, can be reduced in the longitudinal direction of the engaged comb teeth. The following description will be made with reference to the accompanying drawings.

Figure 2:
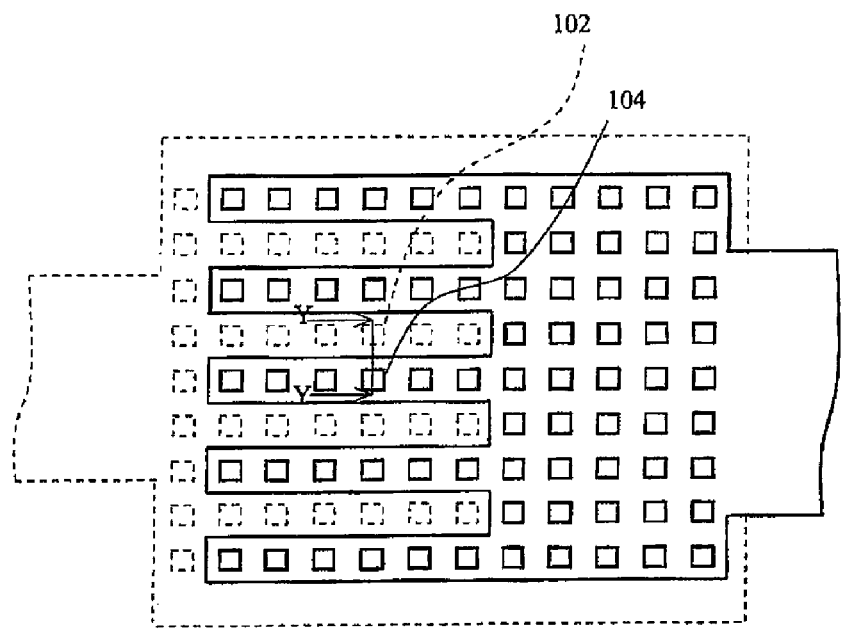
FIG. 2 is the plan view of FIG. 1 with a cut off line Y-Y added.
Figure 3:
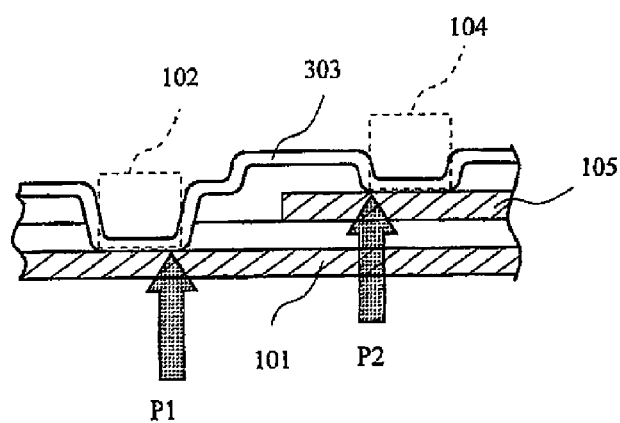
FIG. 3 is a schematic cross-sectional view of the array substrate manufactured by the process of connecting scan lines and signal lines through an ITO layer.
Figure 4:
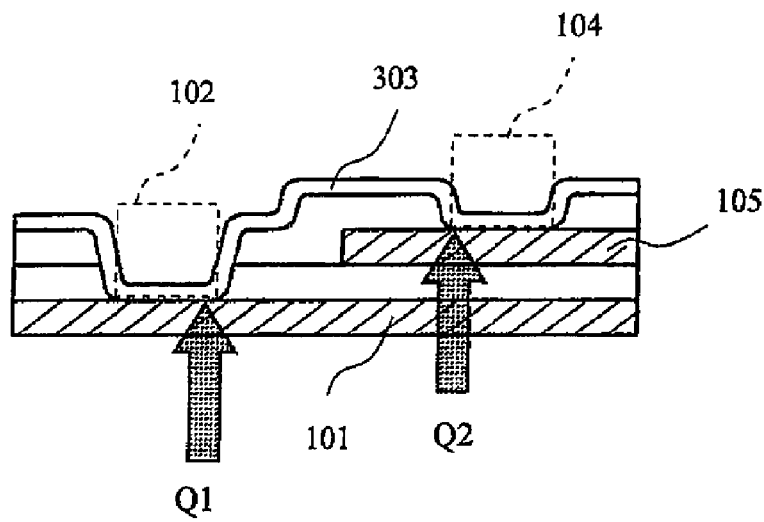
FIG. 4 is a schematic cross-sectional view taken along the cut off line Y-Y as shown in FIG. 2.
Figure 5:
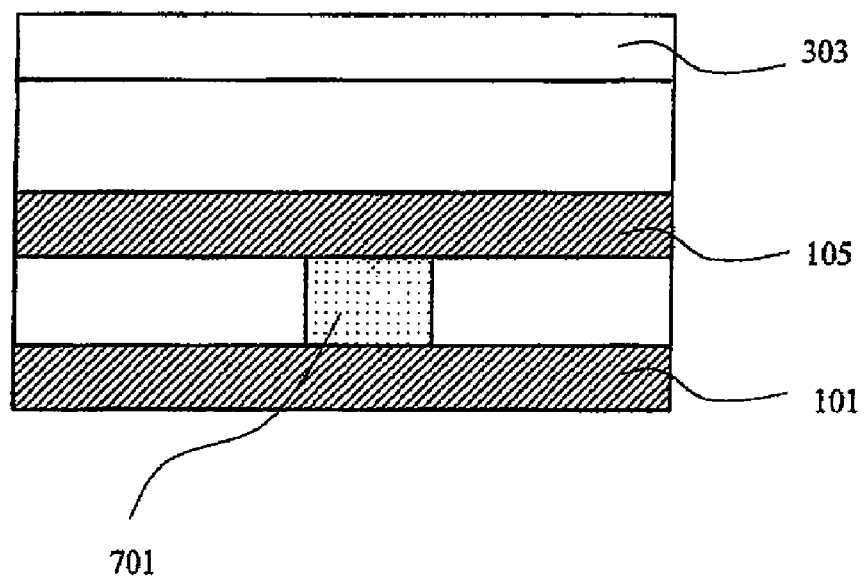
FIG. 5 is a schematic cross-sectional view indicating scan lines and signal lines being connected directly by through-holes.

FIG. 2 is the plan view of FIG. 1 with the cut off line Y-Y added;

FIG. 4 is a schematic cross-sectional view taken along the cut off line Y-Y as shown in FIG. 2. In FIG. 4, 102 denotes a scan line layer through-hole, 104 denotes a signal line layer through-hole, Q1 denotes a point in the part of the scan line layer 101 abutting the scan line layer through-hole 102, which is the nearest point to the signal line layer through-hole 104, Q2 denotes a point in the part of the signal line layer 105 abutting the signal line layer through-hole 104, which is the nearest point to the scan line layer through-holes 104, and 303 denotes an ITO layer.

The resistance value of the part between the scan line layer 101 and the signal line layer 105 which are connected by the scan line layer through-holes 102 and the signal line layer through-holes 104 depends on the resistance value of the ITO layer between the point Q1 and the point Q2, which is directly proportional to the length of the ITO layer between point Q1 and point Q2. So if the scan line layer through-holes 102 and the signal line layer through-holes 104 are arranged in a shape of mutually engaged combs, the length between point Q1 and point Q2 in the ITO layer becomes shorter than that of the prior art, and the resistance value of the part between the scan line layer 101 and the signal line layer 105 which are connected via the scan line layer through-holes 102 and the signal line layer through-holes 104 can be reduced.

The present invention can achieve better effects if an ITO layer with higher resistance rate is used.

In addition, the transparent electrode layer may also be a layer made of materials other than ITO.

In addition, the substrate for the display device in the present invention is manufactured using common known photolithography process, so the description thereof will be omitted.

What is claimed is:

1. A substrate for a display device, comprising:
   a signal line layer having a plurality of signal lines thereon;
   a plurality of signal line layer through-holes being arranged on the signal line layer;
   a scan line layer having a plurality of scan lines thereon;
   a plurality of scan line layer through-holes being arranged on the scan line layer;
   a transparent electrode layer electrically connecting the scan lines and the signal lines via the signal line layer through-holes and the scan line layer through-holes; wherein
   the scan line layer through-holes and the signal line layer through-holes are arranged intercrossedly in a matrix form,
   the scan line layer through-holes and the signal line layer through-holes being arranged intercrossedly includes the scan line layer through-holes and the signal line layer through-holes being staggered in rows,
   the scan line layer through holes and the signal line layer through-holes being staggered in rows includes the scan line layer through-holes and the signal line layer through-holes being arranged in a shape of mutually engaged combs, wherein a comb back of the comb shape of the signal line layer through-holes, which consists of tooth roots of the comb shape of the signal line layer through-holes, is formed by at least two columns of the signal line layer through-holes.

2. The substrate for a display device according to claim 1, wherein the substrate for a display device is a substrate for an active matrix liquid crystal display device.

3. The substrate for a display device according to claim 1, wherein the transparent electrode is made of ITO.

4. The substrate for a display device according to claim 1, further comprising a display unit formed adjacent to each intersection points of the signal lines and the scan lines.

5. The substrate for a display device according to claim 1, wherein
   the signal lines and the scan lines sandwiching an insulation layer therebetween are arranged on an insulation substrate in a longitudinal direction and a latitudinal direction, respectively;
   the transparent electrode layer is set over the signal lines and the scan lines;
   the substrate for a display device is so structured that the signal line layer is formed after the scan line layer is formed, and then the transparent electrode layer is formed in a subsequent process.

6. The substrate for a display device according to claim 5, wherein the scan lines and the signal lines being electrically connected through the transparent electrode layer includes: the scan lines and the signal lines being electrically connected through the transparent electrode layer that is filled in the scan line layer through-holes and the signal line layer through-holes.

7. A display device comprising a substrate, wherein the substrate comprises
   a signal line layer having a plurality of signal lines thereon;
   a plurality of signal line layer through-holes being arranged on the signal line layer;
   a scan line layer having a plurality of scan lines thereon;
   a plurality of scan line layer through-holes being arranged on the scan line layer;
   a transparent electrode layer electrically connecting the scan lines and the signal lines via the signal line layer through-holes and the scan line layer through-holes; wherein
   the scan line layer through-holes and the signal line layer through-holes are arranged intercrossedly in a matrix form,
   the scan line layer through-holes and the signal line layer through-holes being arranged intercrossedly includes the scan line layer through-holes and the signal line layer through-holes being staggered in rows, and
   the scan line layer through-holes and the signal line layer through-holes being staggered in rows includes the scan line layer through-holes and the signal line layer through-holes being arranged in a shape of mutually engaged combs, wherein a comb back of the comb shape of the signal line layer through-holes, which consists of tooth roots of the comb shape of the signal line layer through-holes, is formed by at least two columns of the signal line layer through-holes.

8. The display device according to 7, wherein
   the signal lines and the scan lines sandwiching an insulation layer therebetween are arranged on an insulation substrate in a longitudinal direction and a latitudinal direction, respectively;
   the transparent electrode layer is set over the signal lines and the scan lines;
   the substrate for a display device is so structured that the signal line layer is formed after the scan line layer is formed, and then the transparent electrode layer is formed in a subsequent process; and wherein
   the scan lines and the signal lines being electrically connected through the transparent electrode layer includes: the scan lines and the signal lines being electrically connected through the transparent electrode layer that is filled in the scan line layer through-holes and the signal line layer through-holes.

9. A method for manufacturing a substrate for a display device, comprising
   providing a signal line layer having a plurality of signal line layer through-holes;
   providing a scan line layer having a plurality of scan line layer through-holes;
   filling a transparent electrode layer into the signal line layer through-holes and the scan line layer through-holes, which electrically connects the signal lines and the scan lines,
   wherein the signal line layer through-holes and the scan line layer through-holes are arranged intercrossedly in a matrix form,
   wherein the scan line layer through-holes and the signal line layer through-holes being arranged intercrossedly includes the scan line layer through-holes and the signal line layer through-holes being staggered in rows,
   wherein the scan line layer through-holes and the signal line layer through-holes being staggered in rows includes the scan line layer through-holes and the signal line layer through-holes being arranged in a shape of mutually engaged combs, and wherein a comb back of the comb shape of the signal line layer through-holes, which consists of tooth roots of the comb shape of the signal line layer through-holes, is formed by at least two columns of the signal line layer through-holes.

* * * * *